United States Patent
Fujinaga

(10) Patent No.: US 11,032,755 B2
(45) Date of Patent: Jun. 8, 2021

(54) WIRELESS COMMUNICATION APPARATUS AND CONTROL METHOD THEREOF

(71) Applicant: CANON KABUSHIKI KAISHA, Tokyo (JP)

(72) Inventor: Takashi Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/795,896

(22) Filed: Feb. 20, 2020

(65) Prior Publication Data
US 2020/0275346 A1 Aug. 27, 2020

(30) Foreign Application Priority Data
Feb. 25, 2019 (JP) .............................. JP2019-031391

(51) Int. Cl.
*H04W 48/04* (2009.01)
*H04W 60/04* (2009.01)
*H04W 12/50* (2021.01)

(52) U.S. Cl.
CPC ........... *H04W 48/04* (2013.01); *H04W 12/50* (2021.01); *H04W 60/04* (2013.01)

(58) Field of Classification Search
CPC ..... H04W 48/04; H04W 12/50; H04W 60/04; H04W 84/18; H04W 60/00; H04W 48/02; H04W 4/005; H04W 8/26; H04L 63/061; H04L 63/14161; H02J 7/007; H02J 7/025
See application file for complete search history.

(56) References Cited

U.S. PATENT DOCUMENTS

| | | | | |
|---|---|---|---|---|
| 9,026,840 | B1* | 5/2015 | Kim | G06F 11/30 714/4.3 |
| 2002/0065070 | A1* | 5/2002 | Naiki | H04W 48/04 455/419 |
| 2003/0006905 | A1 | 1/2003 | Shieh | |
| 2006/0244586 | A1* | 11/2006 | Jones | G08B 21/12 340/539.1 |
| 2011/0063093 | A1* | 3/2011 | Fung | G06Q 10/0875 340/10.52 |

(Continued)

FOREIGN PATENT DOCUMENTS

JP 2017-38241 A 2/2017
JP 2018-113535 A 7/2018

*Primary Examiner* — An T Nguyen
(74) *Attorney, Agent, or Firm* — Canon U.S.A., Inc. I.P. Division

(57) ABSTRACT

A wireless communication apparatus includes a communication unit configured to register another wireless communication apparatus and wirelessly communicate with the other wireless communication apparatus, an acquisition unit configured to acquire information indicating a type of the other wireless communication apparatus after the other wireless communication apparatus is registered, an output control unit configured to cause an output unit to output an alert based on the information indicating the type of the other wireless communication apparatus, the information being acquired by the acquisition unit, and a restriction unit configured to restrict an operation to be performed on the other wireless communication apparatus from the wireless communication apparatus in a case where a predetermined signal is not received after the output control unit has caused the output unit to output the alert.

17 Claims, 6 Drawing Sheets

(56) References Cited

U.S. PATENT DOCUMENTS

| | | | |
|---|---|---|---|
| 2011/0302347 A1 | 12/2011 | Schubert | |
| 2012/0161517 A1* | 6/2012 | Kim | H02J 3/14 |
| | | | 307/31 |
| 2012/0258658 A1* | 10/2012 | Matsuo | H04W 8/183 |
| | | | 455/3.06 |
| 2013/0015983 A1 | 1/2013 | Goudy | |
| 2014/0253740 A1* | 9/2014 | Barnwal | G06F 3/005 |
| | | | 348/207.1 |
| 2014/0285143 A1* | 9/2014 | Kwon | H02J 50/20 |
| | | | 320/108 |
| 2015/0097919 A1* | 4/2015 | Karimi-Cherkandi | H04N 7/147 |
| | | | 348/14.07 |
| 2016/0105406 A1* | 4/2016 | Smith | H04W 60/00 |
| | | | 713/171 |
| 2017/0180062 A1* | 6/2017 | Johansen | H04W 76/27 |
| 2020/0275346 A1* | 8/2020 | Fujinaga | H04W 48/04 |

* cited by examiner

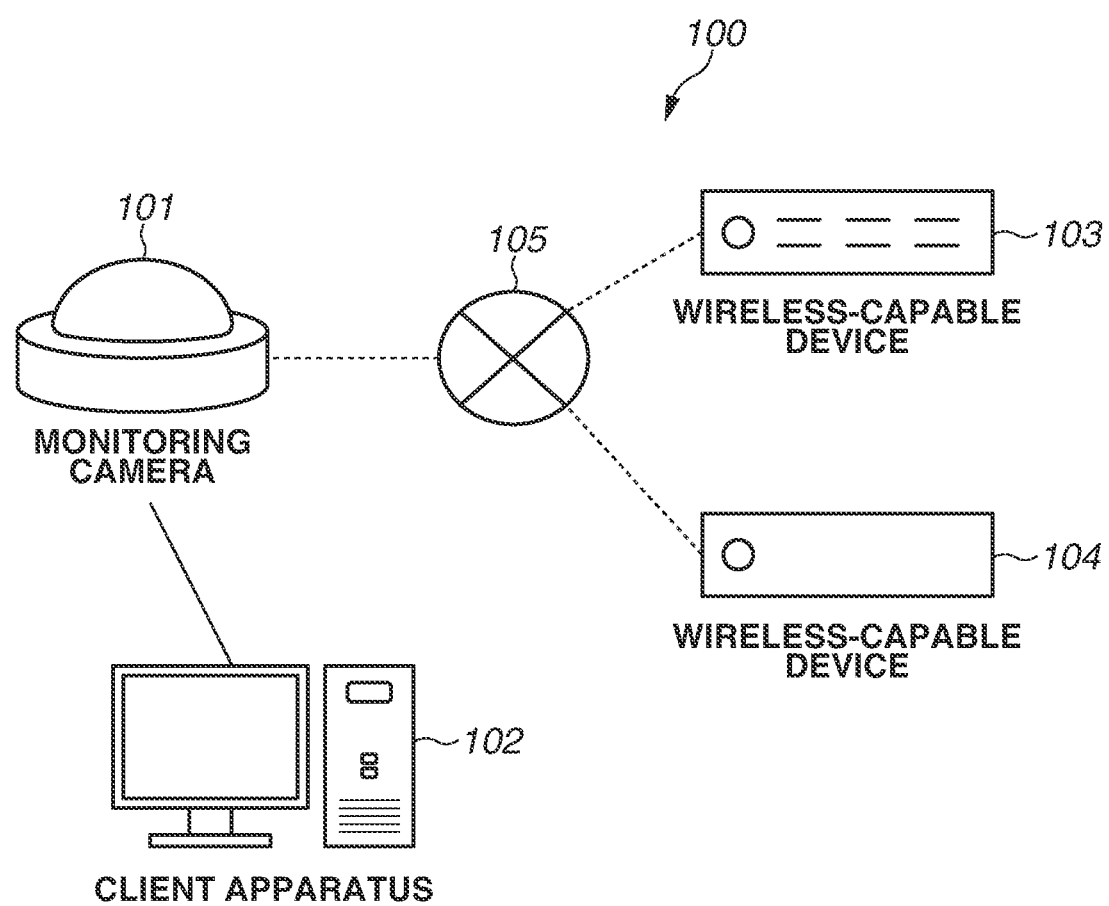

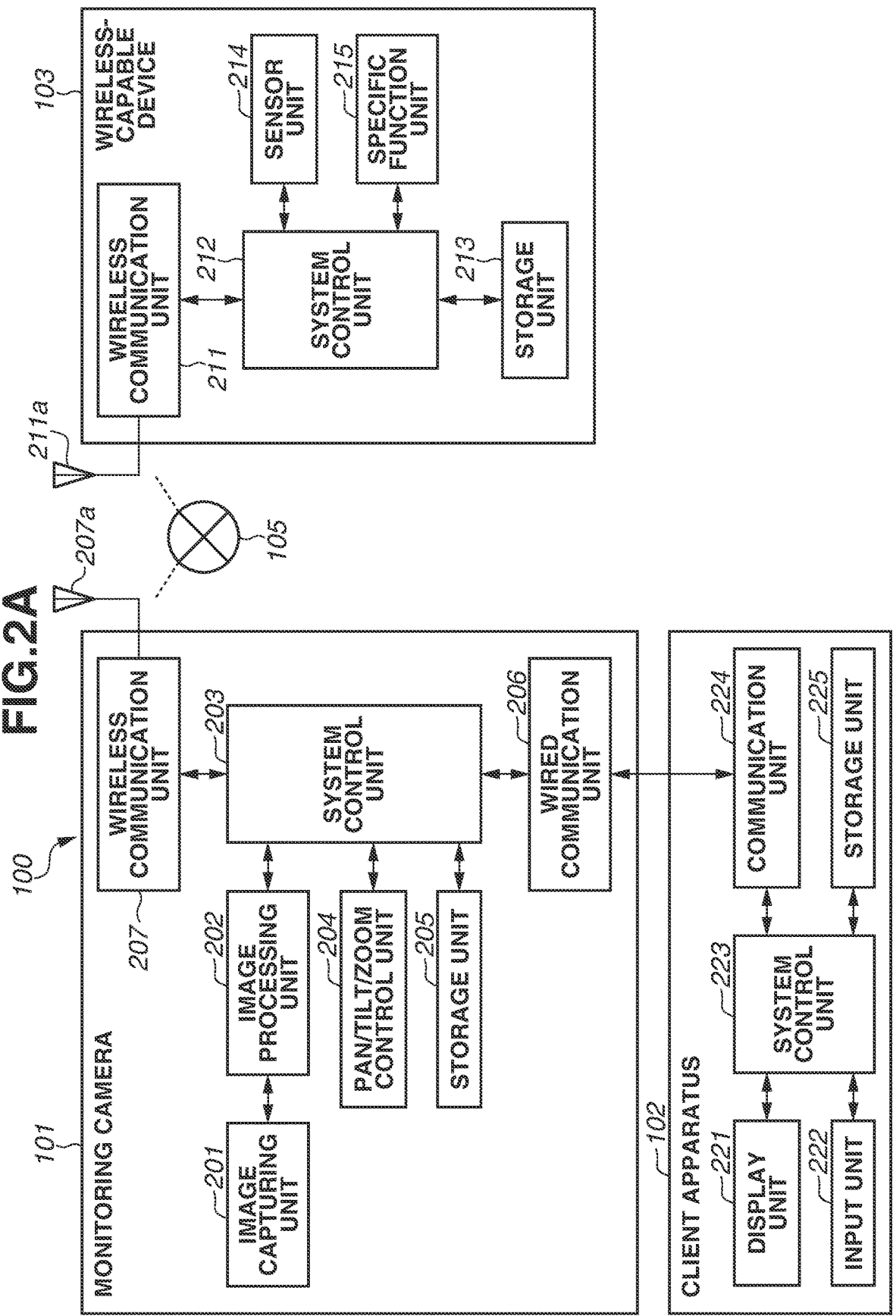

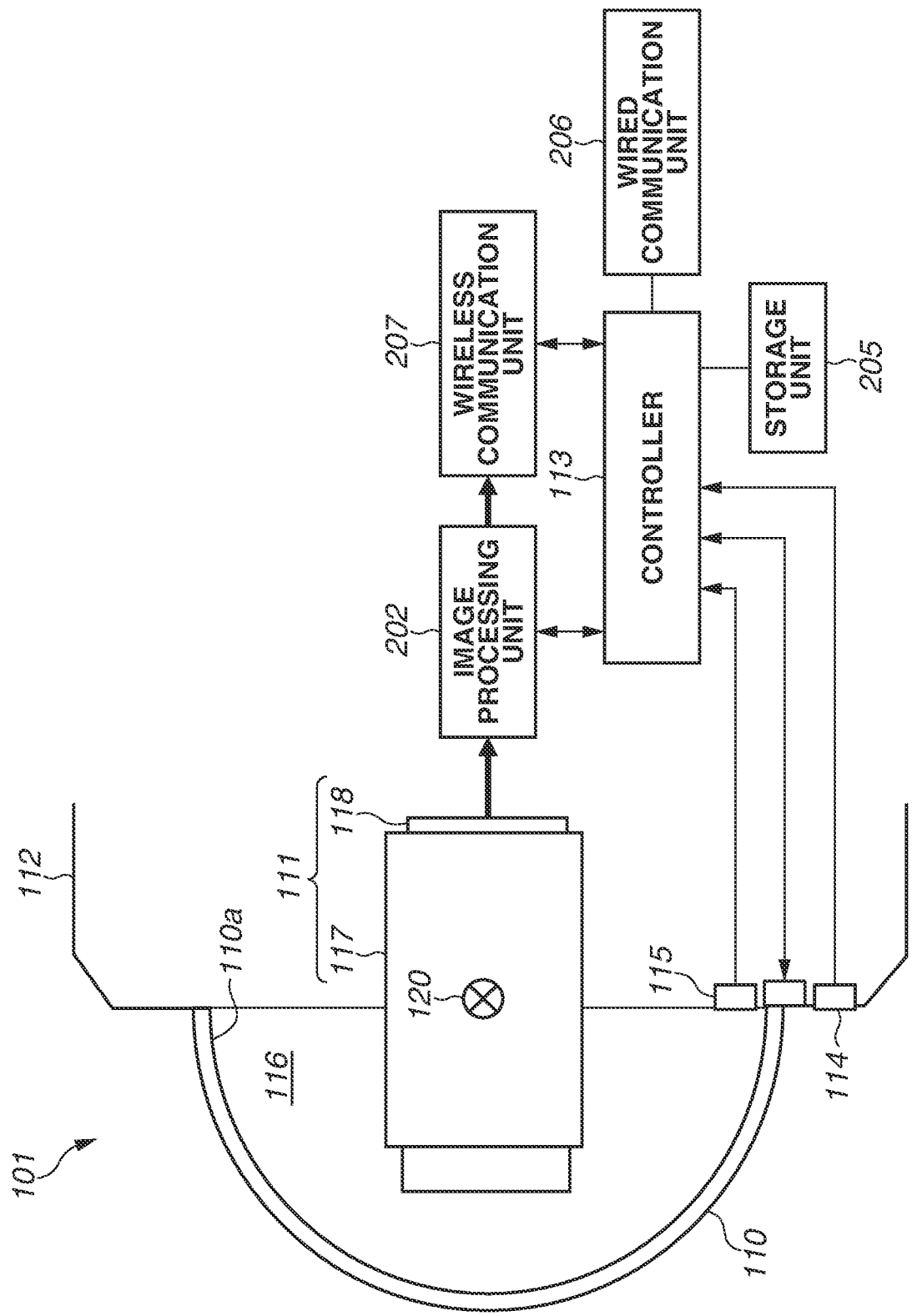

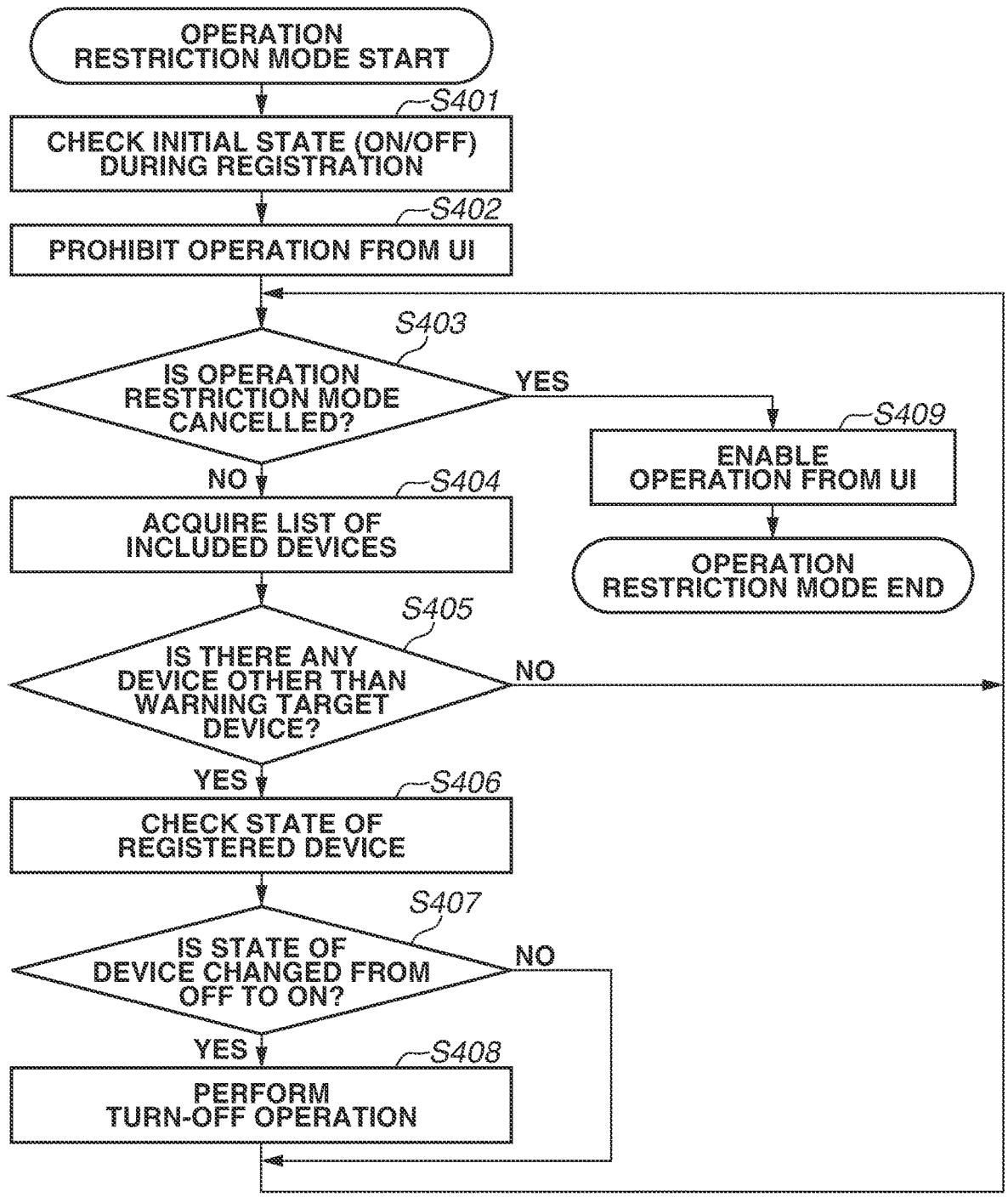

WIRELESS COMMUNICATION APPARATUS AND CONTROL METHOD THEREOF

BACKGROUND OF THE INVENTION

Field of the Invention

The present invention relates to a wireless communication apparatus and a control method thereof.

Description of the Related Art

There are various standards for wireless communications that use radio waves. Examples of such standards include wireless local area network (LAN) standards and Wi-Fi® standards, which are defined in Institute of Electrical and Electronics Engineers (IEEE) 802.11 series of standards, and Bluetooth® standards which are widely used for a headphone, a keyboard, and the like. There are other standards such as ZigBee® and Z-Wave® standards, which are characteristically different from each other in frequency, reach distance, power consumption, transfer rate, and the like.

Since wireless communication apparatuses use radio waves, the wireless communication apparatuses need to perform registration processing to register each other in order to establish communication among themselves. In some cases, information exchanging processing (pairing) for performing data encryption is performed as necessary. Hereinafter, the wireless communication apparatuses are appropriately referred to as a master unit or a slave unit so that the wireless communication apparatuses can be distinguished based on their roles.

The registration processing to be performed when wireless communication is started has two main roles. One of the two main roles is to determine the connection between communication apparatuses that is established by connecting the communication apparatuses with a cable in a case where the communication apparatuses are apparatuses configured to establish wired communication. With this role, apparatuses that are not physically connected can identify each other and communicate with each other. The other of the two main roles is to authenticate connected apparatuses to establish safe communication only between the connected apparatuses. With this role, interception and spoofing by third parties can be prevented.

According to the Z-Wave® standard (hereinafter simply referred to as Z-Wave®), a specific operation is performed between the master unit and the slave unit, to thereby perform a slave unit registration operation called "inclusion". In this registration operation, when an identifier called a "node ID" is allocated (appended) to the slave unit and a communication partner device is identified during wireless communication, the node ID is used. According to Z-Wave®, the node ID is used not only for communication between the master unit and the slave unit but also for communication between slave units. Accordingly, if the master unit registers (includes) a certain slave unit, the registered slave unit can be controlled based on the Z-Wave® standard from a device other than the master unit. Cancelling the registration is referred to as "exclusion".

Devices that are compatible with Z-Wave® are categorized based on the device type. According to Z-Wave®, the master unit can acquire the device type of each device compatible with Z-Wave® only after the device is registered.

Japanese Patent Application Laid-Open Nos. 2018-113535 and 2017-38241 discuss a configuration for performing a warning display for a function or operation of an apparatus.

In the configuration discussed in Japanese Patent Application Laid-Open No. 2018-113535, electric power required for an attached device is checked, and if the power is insufficient, a warning indicating that the power is insufficient is displayed on a display unit.

In the configuration discussed in Japanese Patent Application Laid-Open No. 2017-38241, if a three-dimensional (3D) function of a camera cannot be used by an attached device, an error is displayed on a display unit.

However, in the configuration discussed in Japanese Patent Application Laid-Open No. 2018-113535, a control operation for prohibiting the use of a device during warning display, and permitting the use of the device by responding to the warning is not carried out. In the configuration discussed in Japanese Patent Application Laid-Open No. 2017-38241, a control operation for turning on or off a 3D image capturing function depending on whether to respond to the warning display is not carried out. For example, in the case of using a slave unit that is required to issue a warning about the usage of the slave unit to a user, the slave unit is required to issue the warning about the usage of the slave unit to the user and then restrict an active operation to be performed by the user. However, according to the Z-Wave® standard, a slave unit can be controlled immediately after the registration of the slave unit is completed.

The present invention is directed to providing a wireless communication apparatus capable of outputting an appropriate warning (alert) depending on the type of another wireless communication apparatus registered in the wireless communication apparatus, and appropriately restricting an operation to be performed on the other wireless communication apparatus.

SUMMARY OF THE INVENTION

According to an aspect of the present invention, a wireless communication apparatus includes a communication unit configured to register another wireless communication apparatus and wirelessly communicate with the other wireless communication apparatus, an acquisition unit configured to acquire information indicating a type of the other wireless communication apparatus after the other wireless communication apparatus is registered, an output control unit configured to cause an output unit to output an alert based on the information indicating the type of the other wireless communication apparatus, the information being acquired by the acquisition unit, and a restriction unit configured to restrict an operation to be performed on the other wireless communication apparatus from the wireless communication apparatus in a case where a predetermined signal is not received after the output control unit has caused the output unit to output the alert.

Further features of the present invention will become apparent from the following description of exemplary embodiments with reference to the attached drawings.

BRIEF DESCRIPTION OF THE DRAWINGS

FIG. 1 illustrates a network configuration of a monitoring system according to an exemplary embodiment of the present invention.

FIG. 2A is a functional block diagram illustrating the monitoring system according to the exemplary embodiment.

FIG. 2B illustrates a hardware configuration of a monitoring camera.

FIG. 4 is a flowchart illustrating a detailed processing flow in an operation restriction mode of the monitoring system according to the exemplary embodiment.

DESCRIPTION OF THE EMBODIMENTS

Figure 3A:
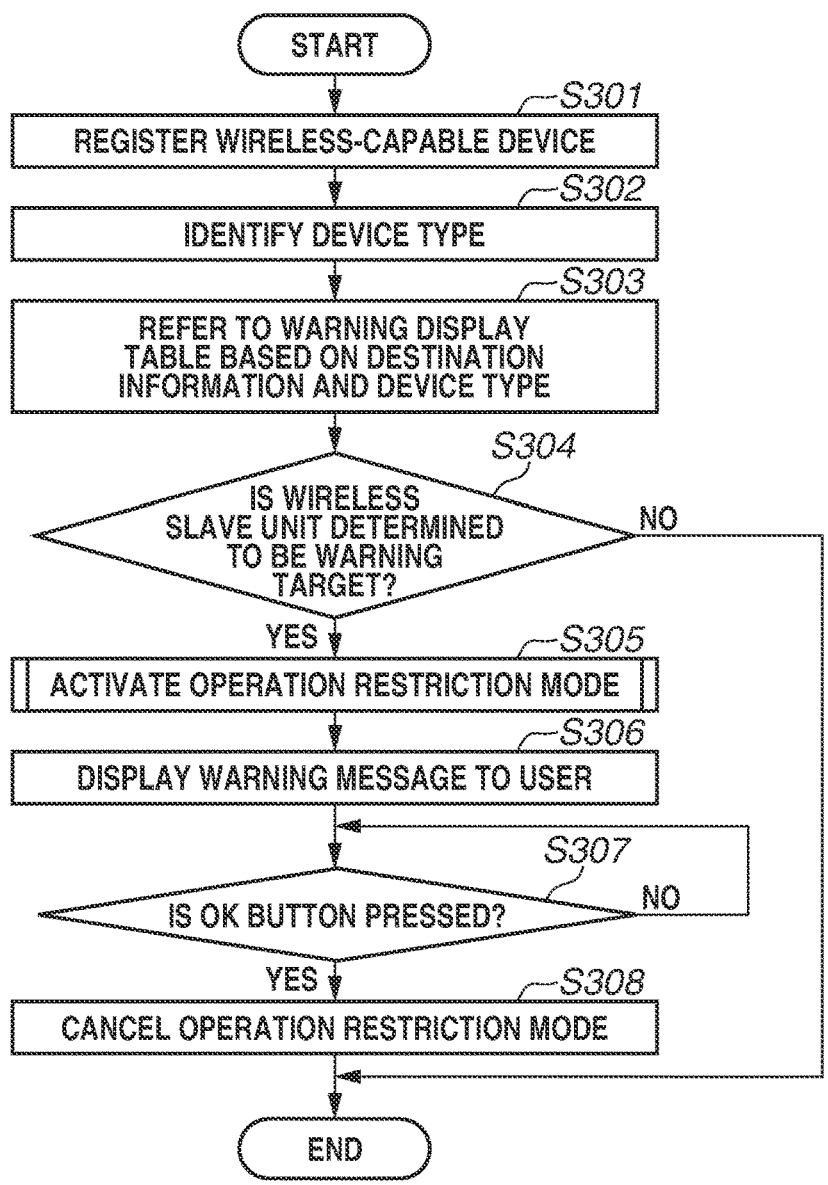
FIG. 3A is a flowchart illustrating a main flow of processing to be performed by the monitoring system according to the exemplary embodiment.

Exemplary embodiments of the present invention will be described in detail with reference to the accompanying drawings. The following exemplary embodiments are not intended to limit the present invention, and not all combinations of features described in the exemplary embodiments are essential to the solving means of the present invention. The configurations of the exemplary embodiments can be appropriately modified or changed depending on the specifications of the system and apparatus to which the present invention is applied and various conditions (usage conditions, usage environment, etc.). The technical scope of the present disclosure is defined by the claims and is not limited by the following individual exemplary embodiments. The following exemplary embodiments illustrate a monitoring camera including a communication function as an example of a wireless communication apparatus according to the present invention. However, the wireless communication apparatus according to the present invention is not limited to a monitoring camera.

<Network Configuration of Monitoring System>

FIG. 1 illustrates a network configuration example of a monitoring system 100 according to an exemplary embodiment of the present invention. The monitoring system 100 according to the present exemplary embodiment mainly includes a monitoring camera 101 (wireless communication apparatus), a client apparatus 102, and a wireless-capable device 103 (another wireless communication apparatus). Assume that the Z-Wave® standard is used as a wireless communication standard in the present exemplary embodiment. The monitoring system 100 is used in, for example, a general household. The monitoring system 100 is an example of a wireless communication system. The monitoring camera 101 is a domed camera.

The monitoring camera 101 (wireless communication apparatus) operates as a Z-Wave® master unit, and the wireless-capable device 103 operates as a Z-Wave® slave unit (wireless slave unit).

The monitoring camera 101 and the client apparatus 102 are connected by a wired connection, and thus can communicate with each other. The monitoring camera 101 and the client apparatus 102 may be connected via a wireless network. The wireless-capable device 103 is connected to the monitoring camera 101 via a wireless network 105. The wireless-capable device 103 is, for example, an electric light or a power strip.

A plurality of wireless-capable devices 103 (other wireless communication apparatuses) may be installed. For example, if a second wireless-capable device 104 (a third wireless communication apparatus) is present, the second wireless-capable device 104 can directly communicate with the wireless-capable device 103 via the wireless network 105, or can communicate with the wireless-capable device 103 without involving the monitoring camera 101 which is a master unit.

<Functional Blocks of Monitoring System>

FIG. 2A is a functional block diagram illustrating the monitoring system 100 according to the present exemplary embodiment.

<Monitoring Camera>

The monitoring camera 101 includes an image capturing unit 201, an image processing unit 202, a system control unit 203 (output control means, restriction means), a pan/tilt/zoom control unit 204, a storage unit 205, a wired communication unit 206 (output means), and a wireless communication unit 207 (communication means).

The image capturing unit 201 includes a lens and an image sensor. The image capturing unit 201 captures an image of an object, and converts light into an electrical signal. The image capturing unit 201 transmits the electrical signal to the image processing unit 202.

The image processing unit 202 performs image processing and compression coding processing on the electrical signal received from the image capturing unit 201, generates image data, and transmits the generated image data to the system control unit 203.

The system control unit 203 (output control means) transmits the image data received from the image processing unit 202 to the client apparatus 102 via the wired communication unit 206 (output means).

The system control unit 203 analyzes a camera control command received from the client apparatus 102 via the wired communication unit 206, and performs processing based on the camera control command. For example, the system control unit 203 sends an instruction for setting image capturing parameters to the image processing unit 202 and the pan/tilt/zoom control unit 204. Specifically, the system control unit 203 transmits an instruction signal for performing an image quality adjustment setting to the image processing unit 202, and sends an instruction signal for performing a pan/tilt/zoom operation setting to the pan/tilt/zoom control unit 204.

The pan/tilt/zoom control unit 204 controls a pan driving unit, a tilt driving unit, and a zoom driving unit, which are not illustrated, based on the instruction signal received from the system control unit 203.

The pan/tilt/zoom control unit 204 can acquire a pan angle, a tilt angle, and a zoom angle by analyzing device information about the pan driving unit, the tilt driving unit, and the zoom driving unit. The pan/tilt/zoom control unit 204 transmits the pan angle, the tilt angle, and the zoom angle to the system control unit 203 based on the instruction signal received from the system control unit 203.

The storage unit 205 stores parameters for image quality adjustment and network setting values. The storage unit 205 stores information about an identification (ID) of the wireless slave unit. The ID is required for wireless communication. Accordingly, the monitoring camera 101 can refer to previously-set values by using the contents stored in the storage unit 205 even after the monitoring camera 101 is restarted.

The storage unit 205 also stores destination information set in the monitoring camera 101. The destination information set in the monitoring camera 101 is, for example, information about a destination country (country name) to which the monitoring camera 101 is to be shipped. In other words, the destination information is information indicating a location where the monitoring camera 101 is to be used. The storage unit 205 also stores a warning display table. The warning display table is table information used to determine whether to display a warning (alert) based on the device type information and destination information.

The wired communication unit 206 performs processing for network communication via a local area network (LAN). The wired communication unit 206 is connected to the client apparatus 102 and communicates with the client apparatus 102.

The wireless communication unit 207 performs a control operation for wirelessly communicating with the wireless-capable device 103. The wireless communication unit 207 performs registration (inclusion) processing for allowing the wireless-capable device 103 to participate in the wireless network. The wireless communication unit 207 includes an antenna 207a. In the present exemplary embodiment, the wired communication unit 206 is used to establish communication with the client apparatus 102, but instead the communication with the client apparatus 102 may be established by wireless communication. The configuration for establishing communication with the client apparatus 102 is not limited to the illustrated configuration.

<Client Apparatus>

The client apparatus 102 includes a display unit 221 (output means), an input unit 222, a system control unit 223, a communication unit 224, and a storage unit 225. The client apparatus 102 is, for example, a personal computer (PC), a tablet terminal, or a mobile terminal (such as a smartphone).

The display unit 221 is a liquid crystal display device or the like. The display unit 221 displays image data received from the monitoring camera 101 via the communication unit 224, and displays a warning when a specific operation is carried out. The display unit 221 displays a graphic user interface (GUI) or the like to perform a camera control operation for controlling the monitoring camera 101. Examples of the camera control operation include setting a zoom factor of the monitoring camera 101, changing pan/tilt directions, setting a wireless communication for the monitoring camera 101, and responding to a displayed warning message.

The display unit 221 may include a speaker that outputs sound. The display unit 221 may also include a light-emitting unit that emits light.

The input unit 222 includes a keyboard and a pointing device (such as a mouse). A user of the client apparatus 102 operates the GUI via the input unit 222. For example, the user can turn on and off a specific function unit 215 by operating the GUI. In the present exemplary embodiment, assume that an ON/OFF button is displayed on the GUI and the user can press the ON/OFF button by operating the GUI. The input unit 222 can also be referred to as an instruction unit or an operation unit.

The system control unit 223 requests various information set in the monitoring camera 101 via the communication unit 224 in response to an operation performed by the user (an input from the input unit 222), and transmits a control command input from the input unit 222 (GUI) to the monitoring camera 101.

The communication unit 224 is connected to the wired communication unit 206 of the monitoring camera 101.

The storage unit 225 stores information, such as an Internet Protocol (IP) address of the monitoring camera 101, and network setting values. Previously-set values and information stored in the storage unit 225 can be referred to even after the monitoring camera 101 is restarted.

The functional configuration of the monitoring camera 101 illustrated in FIG. 2A is merely an example. A plurality of functional units may be integrated into one functional unit, or some of the functional units may be divided into a plurality of functional units. One or more functional units of the monitoring camera 101 may be configured using hardware (e.g., a circuit (such as an application specific integrated circuit (ASIC)) that implements one or more functions).

<Wireless-Capable Device>

The wireless-capable device 103 includes a wireless communication unit 211, a system control unit 212, a storage unit 213, a sensor unit 214, and the specific function unit 215. When the wireless-capable device 103 is an electric light, the specific function of the wireless-capable device 103 is an illumination (light emission) function, and the specific function unit 215 operates as an illumination unit (light-emitting unit). The illumination unit includes, for example, one or more light-emitting diodes (LEDs). When the wireless-capable device 103 is a power strip, the specific function of the wireless-capable device 103 is a power supply function, and the specific function unit 215 operates as a power supply unit.

The wireless communication unit 211 wirelessly communicates with the monitoring camera 101 via the wireless network 105. The wireless communication enables the monitoring camera 101 to control the wireless-capable device 103, and enables the wireless-capable device 103 to transmit information to the monitoring camera 101 at predetermined intervals. The wireless communication unit 211 includes an antenna 211a.

The system control unit 212 controls the sensor unit 214, and stores information obtained from the sensor unit 214 in the storage unit 213. The system control unit 212 can also drive the specific function unit 215 in response to an instruction signal received via the wireless communication unit 211.

Further, the system control unit 212 transmits information indicating the state of the wireless-capable device 103 and the obtained information, which are stored in the storage unit 213, to the outside via the wireless communication unit 211. The wireless communication unit 211 that has received an instruction signal from the system control unit 212 transmits the information.

The functional block diagram of FIG. 2A illustrates only one wireless-capable device 103, but instead a plurality of wireless-capable devices may be included. If a plurality of wireless-capable devices is included, the wireless-capable devices can wirelessly communicate with each other.

The storage unit 213 includes a storage medium, such as a read-only memory (ROM), a random access memory (RAM), a hard disk drive (HDD), a flash memory, or a detachably mountable Secure Digital (SD) card, and stores various information. The storage unit 213 stores, for example, device type information indicating the type of the wireless-capable device 103 (information indicating a device type) defined in the Z-Wave® standard.

The sensor unit 214 detects an external temperature, humidity, illuminance, and the like, thereby acquiring information about the external temperature, humidity, illuminance, and the like. The sensor unit 214 transmits the acquired information to the system control unit 212.

The specific function unit 215 drives the illumination such as an LED, and supplies power to a predetermined element.

<Hardware Configuration of Monitoring Camera>

FIG. 2B illustrates a hardware configuration example of the monitoring camera 101.

The monitoring camera 101 includes a dome cover 110, a camera module 111, a monitoring camera main body 112, a controller 113, an external ambient light sensor 114, an internal ambient light sensor 115 the image processing unit 202, the storage unit 205, the wired communication unit 206, and the wireless communication unit 207.

The dome cover 110 is indicated by a section in a direction in which the camera module 111 performs a tilt operation, and the dome cover 110 has a semicircular shape in a sectional view. The dome cover 110 is provided to cover at least the front surface of the camera module 111. A space 116 is formed between the dome cover 110 and the camera module 111. An antireflection film coating 110a is coated on the inner surface of the dome cover 110.

The camera module 111 includes a lens unit 117 and an image sensor 118. The lens unit 117 includes a plurality of lenses. Light (video image) from an image capturing target is projected on the image sensor 118 through the lens unit 117. The image sensor 118 converts a projected image (light) into an electrical signal, and sends the electrical signal to the image processing unit 202.

The camera module 111 has a tilt axis 120 to be used during the tilt operation, and a pan axis (not illustrated) to be used during a pan operation (turning operation). The lens unit 117 and the image sensor 118 perform the tilt operation about the tilt axis 120, and also perform the pan operation about the pan axis. The camera module 111 also includes a mechanism (not illustrated) necessary for the tilt operation and the pan operation. The camera module 111 also includes a zoom function.

A part of the camera module 111, the image processing unit 202, the wireless communication unit 207, and the controller 113 are housed in the monitoring camera main body 112. The external ambient light sensor 114 and the internal ambient light sensor 115 are provided on the monitoring camera main body 112.

The controller 113 includes, for example, one or more central processing units (CPUs). The controller 307 performs various processes based on programs stored in the storage unit 205.

The external ambient light sensor 114 is a sensor that detects the amount of light (external ambient light) on the outside of the dome cover 110. The internal ambient light sensor 115 is a sensor that detects the amount of light (internal ambient light) on the inside of the dome cover 110.

The image processing unit 202 receives the electrical signal from the image sensor 118. The image processing unit 202 performs processing, such as color separation, white balancing, or gamma correction, on the electrical signal, and sends the processed signal to the wireless communication unit 207. The image processing unit 202 also sends the processed signal to the controller 113.

The wired communication unit 206 is connected to the client apparatus 102 and communicates with the client apparatus 102.

The wireless communication unit 207 converts the signal received from the image processing unit 202 into a predetermined video signal, and compresses the video signal. The wireless communication unit 207 delivers the compressed video signal to the client apparatus 102.

<Processing to be Performed by Monitoring System>

FIG. 3A is a flowchart illustrating a main flow of processing to be performed by the monitoring system 100 according to the present exemplary embodiment.

A control operation to be performed by the monitoring camera 101 on the wireless-capable device (wireless slave unit) 103 via the wireless network 105 will be described with reference to FIG. 3A. In the present exemplary embodiment, the monitoring camera 101 communicates with the wireless-capable device 103 via the wireless network 105, and displays a warning related to the wireless-capable device 103 based on the acquired information about the wireless slave unit. If a response to the displayed warning is not received from the user, the monitoring camera 101 (restriction means 203) restricts an operation to be performed by the user (operation to be performed on the wireless-capable device 103). In the following description, assume that wireless communication defined in the Z-Wave® standard is used.

In step S301, the user displays the GUI of the monitoring camera 101 on the display unit 221 of the client apparatus 102, and performs an operation for performing registration (inclusion) processing for registering the wireless-capable device 103 by using the GUI. The signal corresponding to the operation is transmitted to the monitoring camera 101 from the client apparatus 102. The monitoring camera 101 which has received the signal from the client apparatus 102 allocates a node ID for identifying the wireless-capable device 103 in the registration operation to the wireless-capable device 103, and stores the node ID in the storage unit 205.

In step S302, the monitoring camera 101 acquires the device type information about the wireless-capable device 103 from the wireless-capable device 103 (storage unit 213), and identifies the device type of the wireless-capable device 103. The monitoring camera 101 stores the device type information in the storage unit 205.

In step S303, the monitoring camera 101 refers to the warning (alert) display table based on the destination information (destination to which the monitoring camera 101 is to be shipped) set in the monitoring camera 101 and the device type information acquired in step S302. The warning display table is used to determine whether to display a warning (alert) based on the destination information and the device type information.

In step S304, the monitoring camera 101 determines whether the wireless-capable device 103 is a warning target device based on the warning display table. If the monitoring camera 101 determines that the wireless-capable device 103 is not the warning target device (NO in step S304), the processing is terminated.

If the monitoring camera 101 determines that the wireless-capable device 103 is the warning target device (YES in step S304), the processing proceeds to step S305.

The above-described determination using the warning display table based on the destination information makes it possible to discriminate whether the wireless-capable device 103 is a warning target depending on a destination country. Accordingly, if it is desirable to issue a warning under the laws and regulations of the country, the wireless-capable device 103 can be determined to be a warning target, and if it is not necessary to issue a warning, the wireless-capable device 103 can be excluded from the warning target. Whether to display the warning or not may be determined without using the destination information.

In step S305, the monitoring camera 101 is set to a mode for restricting an operation to be performed on the wireless-capable device 103 by the user (the mode is hereinafter referred to as an "operation restriction mode"). When the monitoring camera 101 is set to the operation restriction mode, the monitoring camera 101 starts a flowchart illustrated in FIG. 4. Specifically, the flowchart illustrated in FIG. 4 is started as a process different from the flowchart illustrated in FIG. 3A, and the flowchart illustrated in FIG. 3A and the flowchart illustrated in FIG. 4 are carried out in parallel until the operation restriction mode is cancelled (step S308).

Figure 3B:
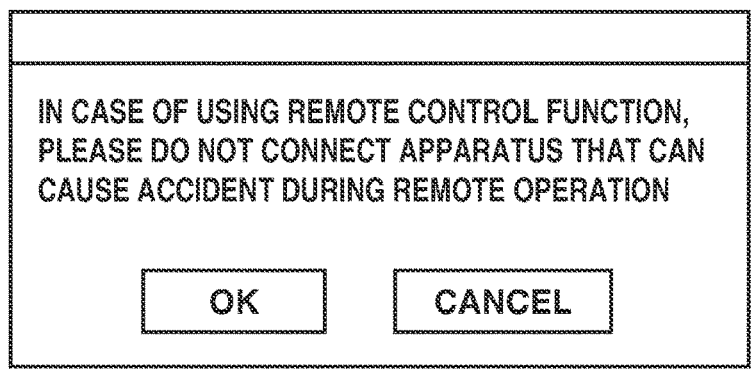
FIG. 3B illustrates a warning message.

In step S306, the monitoring camera 101 displays a warning message to the user. Specifically, the system control unit 203 or the controller 113 of the monitoring camera 101 causes the display unit 221 of the client apparatus 102 to display a warning message. Examples of the warning display include a warning pop-up display illustrated in FIG. 3B. As another example of the warning display, a warning message may be displayed on a web page on which the user is operating. The warning message included in the warning pop-up display illustrated in FIG. 3B is illustrated by way of example, and other warning messages may be displayed.

In step S307, the monitoring camera 101 determines whether an operation indicating that the user has checked the warning display (warning message) displayed in step S306 is carried out. In the present exemplary embodiment, assume that the operation indicating that the user has checked the warning message is an operation in which the user presses an "OK" button on the warning pop-up display. The operation indicating that the user has checked the warning message is not limited to this operation. For example, if a checkbox indicating that the warning message has been read by the user is checked, it may be determined that the user has checked the warning message. In other words, any operation may be used as the operation indicating that the user has checked the warning message, as long as the operation indicates that the user has read (checked) the warning message. The user can press the "OK" button or check the checkbox by operating the GUI through the input unit 222. A signal indicating how the user has operated the GUI through the input unit 222 (e.g., whether the user has pressed the "OK" button) is transmitted from the system control unit 223 of the client apparatus 102 to the system control unit 203 of the monitoring camera 101 through the communication unit 224.

If it is determined that the operation indicating that the user has checked the warning message is carried out in step S307 (YES in step S307), the processing proceeds to step S308.

In step S308, the monitoring camera 101 cancels the operation restriction mode. In other words, upon receiving a predetermined signal, the monitoring camera 101 cancels the restriction of the operation. When the operation restriction mode is cancelled, the monitoring camera 101 terminates the processing in the flowchart illustrated in FIG. 4, which is started as another process in step S305.

The processing from step S305 to step S308 is continuously performed in the operation restriction mode, unless the user sends a response to the warning display. The operation restriction mode is maintained, for example, even in a case where the web page is closed once in step S307 and the web page for Z-Wave® setting is opened again. In this case, the warning message may be displayed again on the web page.

<Operation Restriction Mode>

FIG. 4 is a flowchart illustrating a processing flow in the operation restriction mode of the monitoring system 100 according to the present exemplary embodiment. This flowchart is started as another process in step S305 illustrated in FIG. 3A, and ends in step S308. Processing for disabling the operation of the wireless-capable device 103 from the GUI and processing for forcibly turning off the wireless-capable device 103 when another wireless-capable device 104 controls the wireless capable device 103 will be described with reference to FIG. 4.

First, in step S401, the monitoring camera 101 acquires information about the specific function from the storage unit 213 of the registered wireless-capable device 103, and the wireless communication unit 207 (detection means) detects an initial ON/OFF state (ON/OFF information) of the wireless-capable device 103. When the wireless-capable device 103 is an electric light, the ON/OFF state corresponds to the ON/OFF state of the electric light. When the wireless-capable device 103 is a power strip, the ON/OFF state corresponds to a state where power is fed and a state where power is not fed. In other words, the ON/OFF state indicates ON/OFF information about the specific function (specific function unit 215) of the wireless-capable device 103. The monitoring camera 101 stores the detected initial ON/OFF state (information) in the storage unit 205 of the monitoring camera 101.

In step S402, the monitoring camera 101 prohibits the ON/OFF operation from the GUI. For example, the system control unit 203 transmits a predetermined signal to the system control unit 223 of the client apparatus 102, and brings the system control unit 223 into a state where the ON/OFF button or the like on the GUI of the client apparatus 102 cannot be pressed. A method for prohibiting the ON/OFF operation may be determined depending on a method for implementing a web page.

In step S403, the monitoring camera 101 determines whether the operation restriction mode in step S308 illustrated in FIG. 3A has been canceled. If it is determined that the operation restriction mode has not been canceled (NO in step S403), the processing proceeds to step S404.

In step S404, the system control unit 203 acquires a list of devices each registered as a slave unit from the storage unit 205 of the monitoring camera 101. Since the monitoring camera 101 operates as the Z-Wave® master unit, only the monitoring camera 101 can register the slave unit. Accordingly, a list of devices connected to the wireless network 105 can be recognized based on the node ID by referring to the storage unit 205 of the monitoring camera 101.

In step S405, the monitoring camera 101 determines whether a device other than the wireless-capable device 103 that is determined to be the warning target is present on the wireless network. If a device other than the wireless-capable device 103 is not present on the wireless network (NO in step S405), the processing returns to step S403. If a device other than the wireless-capable device 103 is present on the wireless network (YES in step S405), i.e., if the second wireless-capable device 104 is present on the wireless network, the processing proceeds to step S406.

In step S406, the monitoring camera 101 checks the state of the wireless-capable device 103. The state checking processing in step S406 may be processing similar to step S401 (i.e., processing of checking the ON/OFF state of the specific function unit 215). The monitoring camera 101 stores the state (information) acquired in step S406 in the storage unit 205.

In step S407, the monitoring camera 101 determines whether the device state acquired in step S401 is an OFF state and the device state acquired in step S406 is an ON state. In other words, the monitoring camera 101 determines whether the state of the specific function unit 215 has been changed from the OFF state to the ON state. For example, an ON signal supplied from the second wireless-capable device 104 can bring the wireless-capable device 103 into the ON state.

If it is determined that the state of the specific function unit 215 has been changed from the OFF state to the ON state (YES in step S407), the processing proceeds to step S408. If it is determined that the state of the specific function unit 215 has not been changed from the OFF state to the ON state (NO in step S407), the processing returns to step S403.

In step S408, the monitoring camera 101 transmits a control command to the wireless-capable device 103. Based on the control command, the system control unit 212 of the wireless-capable device 103 performs processing for changing the state of the specific function unit 215 to the OFF state. This processing is automatically carried out. In other words, this processing is carried out independently of a GUI operation performed by the user. After this processing is terminated, the processing returns to step S403.

In step S403, if the operation restriction mode in step S308 illustrated in FIG. 3A has been canceled (YES in step S403), the processing proceeds to step S409 to permit (enable) the ON/OFF operation from the GUI. Specifically, the operation of pressing the ON/OFF button or the like is permitted. A method for permitting the ON/OFF operation may be determined depending on a method for implementing a web page.

By the processing from step S401 to step S409, the monitoring camera 101 prohibits the use of the wireless-capable device 103 from the GUI of the client apparatus 102 via the monitoring camera 101. Even in a case where the second wireless-capable device 104 brings the wireless-capable device 103 into the ON state, the monitoring camera 101 transmits a signal for prohibiting the use of the wireless-capable device 103 to the wireless-capable device 103, thereby making it possible to bring the specific function unit 215 into the OFF state.

<Warning Display in Conjunction with Event>

Figure 5A:
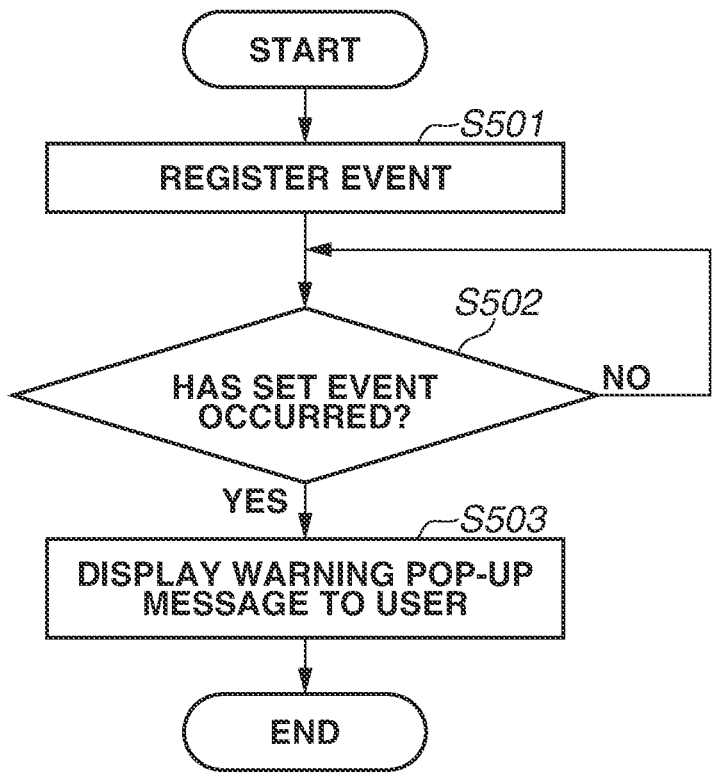
FIG. 5A is a flowchart illustrating a processing flow to be performed when the monitoring system performs a warning display in conjunction with an event.
Figure 5B:
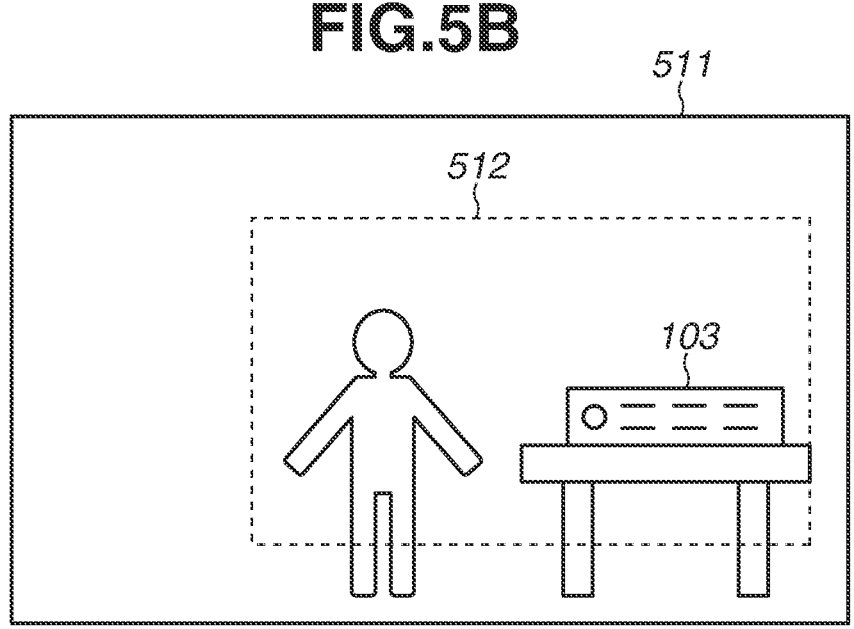
FIG. 5B illustrates a video image captured by the monitoring camera.

FIG. 5A is a flowchart illustrating a processing flow to be performed when the monitoring system 100 according to the present exemplary embodiment displays a warning in conjunction with an event. FIG. 5B illustrates an example of a video image captured by the monitoring camera 101. A case where the wireless-capable device 103 is used in a normal mode after step S308 (or step S409) and a warning message is displayed again will be described with reference to FIGS. 5A and 5B.

In step S501, the monitoring camera 101 registers a condition for displaying a warning message as an event. For example, a condition in which the wireless-capable device 103 is in the ON state in an unattended environment is set as the condition for displaying a warning message. A case where it is determined whether to use the wireless-capable device 103 in an unattended environment will be described with reference to FIG. 5B.

As illustrated in FIG. 5B, the user of the client apparatus 102 opens a web page for setting the monitoring camera 101 on the display unit 221 of the client apparatus 102 during registration processing. The user sets a rectangular area 512 in a video image 511 of the web page. The monitoring camera 101 detects whether a human body is present in the rectangular area 512 (or an unattended environment). Examples of the detection method may include human body detection, face detection, and simple moving object detection. The above-described detection makes it possible to determine whether there is a human body near the wireless-capable device 103 based on the video image captured by the monitoring camera 101. If a state where no human body is present near the wireless-capable device 103 continues for a predetermined period or longer, it may be determined that the wireless-capable device 103 is used in an unattended environment. The event information set in step S501 is stored in the storage unit 205 of the monitoring camera 101. The rectangular area 512 defines a predetermined area near the wireless-capable device 103.

As the condition for displaying a warning message, a condition in which the wireless-capable device 103 is in the ON state when the registration is cancelled (excluded) from the wireless network 105 may be set.

In step S502, the monitoring camera 101 determines whether the event set in step S501 has occurred. If it is determined that the event has occurred (YES in step S502), the processing proceeds to step S503. If it is determined that the event has not occurred (NO in step S502), the processing of step S502 is repeated.

In step S503, the monitoring camera 101 causes the display unit 221 of the client apparatus 102 to display a predetermined warning message.

By the processing from step S501 to step S503, a warning message can be displayed in a use state that seems to be unintended by the user, for example, in a state where the wireless-capable device 103 is in the ON state in an unattended environment or after the registration is cancelled (excluded) from the wireless network 105.

According to the present exemplary embodiment, if it is determined that the wireless-capable device 103 requires a warning (reminder) based on the type of the wireless-capable device 103 and the destination information about the wireless-capable device 103, the monitoring camera 101 is set to the operation restriction mode for restricting the operation of the wireless-capable device 103 from (the GUI of) the client apparatus 102. The client apparatus 102 is caused to display a warning message (display a warning to the user). If the user does not perform a predetermined input operation in response to the warning message, the operation restriction mode is continued. Therefore, according to the present exemplary embodiment, a warning message can be displayed depending on the type of the wireless-capable device 103 if a warning is required. If there is no response to the warning message (if the user has not checked the warning message), the operation to be performed by the user is continuously restricted, to thereby ensure the safety associated with the use of the wireless-capable device 103.

If the monitoring camera 101 determines that the wireless-capable device 103 is the warning target device (YES in step S304) in the flowchart illustrated in FIG. 3A, the operation restriction mode is immediately set. However, the present exemplary embodiment is not limited to this processing flow. For example, if the monitoring camera 101 determines that the wireless-capable device 103 is the warning target device (YES in step S304), the processing may proceed to step S306 to display a warning message. The operation restriction mode may not be activated if a predetermined signal is input to the monitoring camera 101 from the client apparatus 102 (when the user presses the "OK" button) within a predetermined period. In this case, if the predetermined signal is not input from the client apparatus 102 to the monitoring camera 101 within the predetermined period, the operation restriction mode is activated.

In the flowchart illustrated in FIG. 3A, it is determined whether the wireless-capable device 103 is the warning target based on the destination information (information indicating a location where the device is to be used) and the device type information in step S303. However, the present exemplary embodiment is not limited to this determination method. For example, it may be determined whether the wireless-capable device 103 is the warning target based only on the device type in step S303. In this case, the warning display table may be a table indicating the correspondence between the device type and information indicating whether to display a warning.

In the present exemplary embodiment, a warning message is displayed on the display unit 221 of the client apparatus 102 to inform the user that the wireless-capable device 103 is the warning target. However, the present exemplary embodiment is not limited to this warning method. For example, if the display unit 221 is provided with a speaker, the speaker may be caused to output warning sound. The warning sound is, for example, sound corresponding to the above-described warning message. The warning sound may be output together with the display of the warning message. If the display unit 221 is provided with a light-emitting unit, the light-emitting unit may be caused to output warning light. The warning light may be output together with the display of the warning message and the output of the warning sound. In other words, any warning method may be used as long as the user can perceive that the wireless-capable device 103 is the warning target. Specifically, the display unit 221 may function as an output unit that outputs a warning (alert), and the output unit may be caused to output an alert (a warning message, warning sound, warning light, or the like) when the operation restriction mode is activated. The system control unit 203 or the controller 113 can also be referred to as an output control unit that controls the output unit.

In the present exemplary embodiment, the display unit 221 of the client apparatus 102 is caused to display a warning message. However, if the monitoring camera 101 is provided with a display unit, the display unit of the monitoring camera 101 may display a warning message.

In step S402, the monitoring camera 101 prohibits the ON/OFF operation from the GUI. This processing is an example of processing for prohibiting changing of a setting for the wireless-capable device 103 on a screen of the display unit 221 of the client apparatus 102.

While the present exemplary embodiment is described assuming that the Z-Wave® standard is used as a wireless communication standard, the communication standard is not particularly limited. Any other generally-used wireless communication standards, such as Wi-Fi®, may also be used. While preferred exemplary embodiments of the present invention have been described above, the present invention is not limited to the exemplary embodiments and can be modified or altered in various ways within the gist of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-031391, filed Feb. 25, 2019, which is hereby incorporated by reference herein in its entirety.

What is claimed is:

1. A wireless communication apparatus comprising:
    a communication unit configured to register another wireless communication apparatus and wirelessly communicate with the another wireless communication apparatus;
    an acquisition unit configured to acquire information indicating a type of the another wireless communication apparatus after the another wireless communication apparatus is registered;
    an output control unit configured to cause an output unit to output an alert based on the information indicating the type of the another wireless communication apparatus, the information being acquired by the acquisition unit; and
    a restriction unit configured to restrict an operation to be performed on the another wireless communication apparatus from the wireless communication apparatus in a case where a predetermined signal is not received after the output control unit has caused the output unit to output the alert.

2. The wireless communication apparatus according to claim 1, wherein the output control unit causes the output unit to output the alert based on the information indicating the type of the another wireless communication apparatus and information indicating a location where the wireless communication apparatus is used.

3. The wireless communication apparatus according to claim 1, wherein in a case where the output unit is an output unit of an external apparatus connected to the wireless communication apparatus, the restriction unit restricts the operation to be performed on the another wireless communication apparatus from the wireless communication apparatus by restricting an operation to be performed on the external apparatus.

4. The wireless communication apparatus according to claim 3, wherein the restriction unit prohibits changing of a setting for the another wireless communication apparatus on a screen of a display unit of the external apparatus.

5. The wireless communication apparatus according to claim 1, wherein in a case where the restriction unit receives the predetermined signal after restricting the operation to be performed on the another wireless communication apparatus from the wireless communication apparatus, the restriction unit cancels the restriction.

6. The wireless communication apparatus according to claim 1, further comprising a detection unit configured to detect an ON/OFF state of the another wireless communication apparatus after the restriction unit restricts the operation to be performed on the another wireless communication apparatus from the wireless communication apparatus, wherein in a case where the state of the another wireless communication apparatus is changed from the OFF state to the ON state, the restriction unit brings the another wireless communication apparatus into the OFF state.

7. The wireless communication apparatus according to claim 6,
wherein the wireless communication apparatus and the another wireless communication apparatus are configured to wirelessly communicate with each other via a wireless network,
wherein the another wireless communication apparatus is configured to communicate with a third wireless communication apparatus via the wireless network, and
wherein the state of the another wireless communication apparatus is changed from the OFF state to the ON state based on a signal supplied from the third wireless communication apparatus.

8. The wireless communication apparatus according to claim 7, wherein in a case where a predetermined event occurs after the restriction unit cancels the restriction, the output control unit causes the output unit to output the alert.

9. The wireless communication apparatus according to claim 8, wherein the predetermined event is an event in which a state where no human body is present within a predetermined area near the another wireless communication apparatus continues for a predetermined period and the detection unit detects the ON state of the another wireless communication apparatus.

10. The wireless communication apparatus according to claim 8, wherein the predetermined event is an event in which the registration by the communication unit is cancelled and the detection unit detects the ON state of the another wireless communication apparatus.

11. The wireless communication apparatus according to claim 1, wherein the alert includes at least one of a warning message, warning sound, and warning light.

12. The wireless communication apparatus according to claim 1, wherein the wireless communication apparatus and the another wireless communication apparatus are configured to wirelessly communicate with each other via a wireless network defined in Institute of Electrical and Electronics Engineers (IEEE) 802.11 series of standards.

13. The wireless communication apparatus according to claim 12,
wherein the wireless network is a wireless network based on a Z-Wave® standard,
wherein the wireless communication apparatus functions as a Z-Wave® master unit, and
wherein the another wireless communication apparatus functions as a Z-Wave® slave unit.

14. The wireless communication apparatus according to claim 13, wherein the type of the another communication apparatus is a device type based on the Z-Wave® standard.

15. The wireless communication apparatus according to claim 1, wherein the wireless communication apparatus is a camera including a communication function.

16. A control method of a wireless communication apparatus, the control method comprising:
registering another wireless communication apparatus and wirelessly communicating with the another wireless communication apparatus;
acquiring information indicating a type of the another wireless communication apparatus after registering the another wireless communication apparatus;
causing an output unit to output an alert based on the acquired information indicating the type of the another wireless communication apparatus; and
restricting an operation to be performed on the another wireless communication apparatus from the wireless communication apparatus in a case where a predetermined signal is not received after the output unit is caused to output the alert.

17. A non-transitory computer-readable storage medium storing a program for causing a wireless communication apparatus to execute processing comprising:
registering another wireless communication apparatus and wirelessly communicating with the another wireless communication apparatus;
acquiring information indicating a type of the another wireless communication apparatus after registering the another wireless communication apparatus;
causing an output unit to output an alert based on the acquired information indicating the type of the another wireless communication apparatus; and
restricting an operation to be performed on the another wireless communication apparatus from the wireless communication apparatus in a case where a predetermined signal is not received after the output unit is caused to output the alert.

* * * * *